United States Patent Office 2,748,127
Patented May 29, 1956

2,748,127

N-[α-CYCLOHEXENYL BENZYL] PIPERAZINES AND METHOD OF MAKING

Richard Baltzly, Tuckahoe, and Peter B. Russell, Crestwood, N. Y., assignors to Burroughs Wellcome & Co. (U. S. A.) Inc., Tuckahoe, N. Y., a corporation of New York No Drawing. Application July 27, 1954,
Serial No. 446,170

8 Claims. (Cl. 260—268)

The present invention relates to a family of piperazine derivatives represented by the formula

I

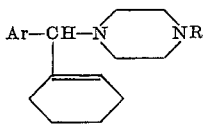

wherein Ar is a phenyl radical and R is a lower alkyl group. These compounds are prepared from the cis-amino alcohols (Formula II) which are described in our copending application Serial No. 409,764 of which this is a continuation-in-part.

II

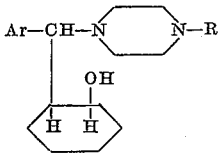

Another copending application Serial No. 442,431, filed July 9, 1954, describes the conversion of the trans-aminoalcohols (III) to the corresponding p-toluene sulfonic esters (tosylates). It has been found that when the

III

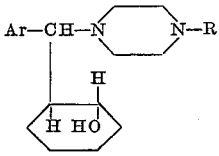

cis-aminoalcohols (II) are dissolved in pyridine and reacted with toluene-sulfonyl chloride, no such tosylates can be isolated but rather the aminoalcohols are converted cleanly into the unsaturated compounds (I). The invention also embraces this convenient and unexpected conversion.

The bases and acid addition-salts of Formula I have marked antihistaminic action and the mono-quaternary ammonium salts (IV) are powerful spasmolytics.

IV

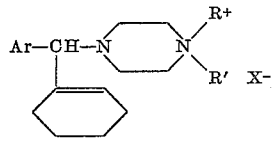

The acid-addition salts are conveniently hydrochlorides but the activity does not reside in the acid portion and hydrobromides, malates, succinates, citrates, phosphates etc. are all equivalent. Further, in Formula IV, X⁻ is commonly the anion of the quaternizing reagent, iodide, bromide, ethylsulfate, toluene sulfonate but these anions are pharmacologically equivalent and choice is to be made only on grounds of convenience. In practice, fluoride or cyanide would not be used but the potency of the compounds is such that equivalent amounts of even those ions would be unimportant.

The reaction by which II is converted to I is in effect an extraordinarily mild dehydration. Such a dehydration, normally produced by acids, is not to be so achieved with these aminoalcohols which are unaltered by moderately drastic treatment with acids and are destroyed by still more vigorous operations. The use of toluene sulfonyl chloride is not critical. This particular sulfonyl chloride is the most readily available and is entirely satisfactory but other sulfonyl chlorides such as benzene-sulfonyl chloride, p-bromobenzenesulfonyl chloride, methane sulfonyl chloride and ethane sulfonyl chloride behave in exactly the same way.

EXAMPLE I

α-[N'-methyl-N-piperazinobenzyl]-cyclohex-Δ¹-ene 2-cis-α-[N'-methyl - N - piperazino]benzylcyclohexanol (17 g.) and p-toluene sulfonyl chloride (31 g.) were mixed in pyridine (100 ml.). After standing overnight, crystals separated which proved to be the p-toluenesulfonate of the starting material. After 100 hours the now homogeneous solution was poured onto ice (700 g.) and the mixture made alkaline with sodium carbonate. The oil was extracted well with ether and the ethereal solution washed with water several times. After being dried the ether was removed and the residue distilled (B. P. 90–95°/1 mm. 11 g.) to give a colorless oil.

Hydrogenation of the above base gave an 80 to 90% yield of neutral material. An ethiodide M. P. 185° (dec.) and an isopropyl iodide M. P. 189–190° (dec.) were obtained by the action of the appropriate halide in acetone solution.

EXAMPLE 2

α-[N'-ethyl-N-piperazino]benzocyclohex-Δ¹-ene

This compound was prepared in a very similar manner to the previous example from 2-cis-α-[N'-ethyl-N-piperazino] benzylcyclohexanol (6.7 g.) and p-toluene sulfonyl chloride (13. g.). The product was an oil B. P. 63–65°/2×10⁻³ mm. (5 g.). This base with ethyl iodide gave a quaternary salt M. P. 211–212°.

EXAMPLE 3

α-[N'-methyl-N-piperazino]-m-methoxybenzylcyclohex-Δ¹-ene

This compound was prepared from the corresponding cis-alcohol (3 g.) in the same manner as the above. It boiled at 70–75° (0.2 mm.) (1.5 gm.) With ethyl iodide, an ethiodide M. P. 193–194 (dec.) was obtained.

What is claimed is:

1. A compound selected from the class consisting of a free base, its nontoxic acid addition salts and its lower-alkyl mono-quaternary ammonium salts, said free base having the formula—

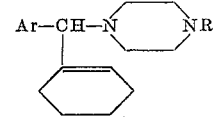

wherein Ar is a phenyl radical and R is a lower alkyl group.

2. A compound of the formula—

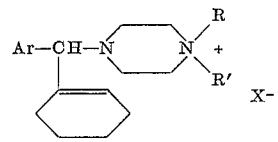

wherein Ar is a phenyl radical and R and R' are lower alkyl radicals and X⁻ is the anion of a non-toxic acid.

3. The process of preparing an N-[α-Δ'-cyclohexenylbenzyl]N'-lower alkyl piperazine which consists of reacting with a reagent selected from the class consisting of the aryl and lower alkyl sulfonyl chlorides having not over seven carbon atoms in an aromatic heterocyclic base as solvent a compound of the formula—

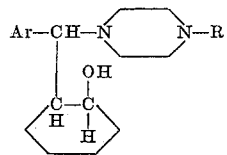

wherein Ar is a phenyl radical and R is a lower alkyl group.

4. α-[N'-methyl-N-piperazinobenzyl]-cyclohex-Δ¹-ene.
5. α-[N'-ethyl-N-piperazino]benzylcyclohex-Δ¹-ene.
6. α-[N'-mthyl - N - piperazino] - m - methoxybenzyl-cyclohex-Δ¹-ene.
7. A nontoxic salt of the N-methyl-N-ethyl-N' [α-(Δ' cyclohexenyl)benzyl] piperazinium ion.
8. a nontoxic salt of the N, N-diethyl-N' [Δ' cyclohexenyl benzyl] piperazinium ion.

No references cited.